(12) United States Patent
Schachtely et al.

(10) Patent No.: US 8,779,031 B2
(45) Date of Patent: Jul. 15, 2014

(54) THERMOPLASTIC ELASTOMER MIXTURES

(75) Inventors: Uwe Schachtely, Kahl am Main (DE); Dieter Kuhn, Rodenbach (DE); Uwe Kinzlinger, Aschaffenburg (DE); Gerold Schmidt, Rodenbach (DE); Guido Scharf, Hasselroth (DE); Joerg Roeder, Schluechtern (DE); Thomas Welker, Hanau (DE)

(73) Assignee: Evonik Degussa GmbH, Essen (DE)

( * ) Notice: Subject to any disclaimer, the term of this patent is extended or adjusted under 35 U.S.C. 154(b) by 189 days.

(21) Appl. No.: 12/941,694

(22) Filed: Nov. 8, 2010

(65) Prior Publication Data
US 2011/0112219 A1    May 12, 2011

(30) Foreign Application Priority Data
Nov. 9, 2009  (DE) .................. 10 2009 046 540

(51) Int. Cl.
C08J 3/20    (2006.01)

(52) U.S. Cl.
USPC ............ 523/351; 524/442; 524/492; 524/493

(58) Field of Classification Search
USPC ......................... 523/351; 524/442, 492, 493
See application file for complete search history.

(56) References Cited

U.S. PATENT DOCUMENTS

| | | | |
|---|---|---|---|
| 4,818,203 A * | 4/1989 | Majerus et al. ............... | 425/115 |
| 5,859,120 A | 1/1999 | Karl et al. | |
| 5,859,133 A | 1/1999 | Zanzig et al. | |
| 6,017,980 A | 1/2000 | Wang et al. | |
| 6,150,453 A | 11/2000 | Mahmud et al. | |
| 6,342,565 B1 | 1/2002 | Cheng et al. | |
| 6,846,865 B2 | 1/2005 | Panz et al. | |
| 2003/0134943 A1 | 7/2003 | Labarre et al. | |
| 2006/0100377 A1 | 5/2006 | Ouhadi | |
| 2008/0058455 A1 * | 3/2008 | Wevers et al. ............... | 524/451 |
| 2009/0137732 A1 | 5/2009 | Panz et al. | |
| 2010/0029818 A1 | 2/2010 | Schachtely et al. | |
| 2010/0092710 A1 | 4/2010 | Welker et al. | |
| 2011/0034590 A1 | 2/2011 | Kuhn et al. | |

FOREIGN PATENT DOCUMENTS

| | | |
|---|---|---|
| DE | 195 21 565 | 1/1997 |
| DE | 196 13 796 | 10/1997 |
| EP | 0 218 134 A2 | 4/1987 |
| EP | 0 218 134 A3 | 4/1987 |
| EP | 1 655 331 | 5/2006 |
| EP | 1 736 505 | 12/2006 |
| EP | 1695987 A1 | 3/2007 |
| EP | 2 123 706 A1 | 11/2009 |
| EP | 2 177 569 | 4/2010 |
| JP | 60-166339 | 8/1985 |
| JP | 10-36623 | 2/1998 |
| JP | 2002-2616 | 1/2002 |
| JP | 2002-201333 | 7/2002 |
| JP | 2006-63156 | 3/2006 |
| JP | 2007-070447 | 3/2007 |
| WO | 98/42778 | 10/1998 |
| WO | 98/45361 | 10/1998 |
| WO | 01/04208 A1 | 1/2001 |
| WO | 2005/019335 A1 | 3/2005 |
| WO | 2009/141185 | 11/2009 |

OTHER PUBLICATIONS

European Search Report for Application No. EP 10 18 7980 dated Feb. 1, 2011.
Chinese Search Report or Application No. 201010543704.5.
Translation of the Notification of Reasons for Refusal issued by the JPO in counterpart Application No. 2010-251131, dated Jan. 30, 2014.

* cited by examiner

*Primary Examiner* — Edward Cain
(74) *Attorney, Agent, or Firm* — Smith, Gambrell & Russell LLP

(57) ABSTRACT

Thermoplastic elastomer mixture which comprises at least one thermoplastic elastomer TPE, with the exception of a thermoplastic polyurethane TPU, and at least one filler from the group of precipitated silica, or precipitated silicate or carbon black.
The thermoplastic elastomer mixtures are produced by, in a first step, mixing at least one filler selected from the group of precipitated silica, or precipitated silicate or carbon black, and at least one thermoplastic to give a masterbatch and, in a second step, mixing the masterbatch with at least one thermoplastic elastomer, with the exception of a thermoplastic polyurethane TPU.
The thermoplastic elastomer mixture can be used in injection-molded items.

9 Claims, No Drawings

THERMOPLASTIC ELASTOMER MIXTURES

The invention relates to thermoplastic elastomer mixtures.

Thermoplastic elastomers (abbreviation TPE) are plastics which have room-temperature behaviour comparable with that of traditional elastomers but which can be subjected to plastic deformation when heated, thus exhibiting thermoplastic behaviour.

Elastomers are usually chemically wide-mesh-crosslinked three-dimensional-network molecules. The crosslinking cannot be removed without decomposition of the material.

Thermoplastic elastomers have domains having physical crosslinking points (secondary valence forces or crystallites) which disappear on heating, without decomposition of the macromolecules. They are therefore substantially more processable than normal elastomers. This also makes it possible to remelt and reprocess waste plastics.

EP 1736505 discloses thermoplastic matrix/compounds comprising from 40 to 99.9% by weight of thermoplastic polymer and from 0.1 to 60% by weight of silanized, structurally modified, fumed silica.

EP 08166704.0 moreover discloses a processing aid comprising
a) from 10-50% by weight of hydrophobized, at least to some extent aggregated metal oxide particles selected from the group consisting of aluminium oxide, silicon dioxide and mixtures of the abovementioned metal oxides,
b) from 20-75% by weight of one or more thermoplastic polyurethanes,
c) from 0.5-25% by weight of one or more isocyanates,
d) from 0.5-15% by weight of one or more compounds acting as lubricants and dispersing agents,
where the entirety of the constituents a) to d) is at least 90% by weight, based on the processing aid.

PCT/EP2009/053404 discloses thermoplastic elastomers comprising fumed silica.

EP 1655331 moreover discloses high-strength thermoplastic vulcanizates, encompassing a dispersing rubber component, a polyolefinic thermoplastic resin component and a propylene copolymer.

By virtue of the processing method, similar to that for plastics, processing cycle times are very short, and thermoplastic elastomers are therefore increasingly used in traditional rubber applications, examples being window seals in the automobile sector.

Examples of other application sectors for thermoplastic elastomers are airbag covers, moveable cable sleeves, seals, etc.

These thermoplastic elastomer mixtures can have the disadvantage of a high level of orientation during production of injection-moulded items. This leads to anisotropy, where there can be a large difference between mechanical properties measured transversely (i.e. perpendicularly with respect to the direction of flow) and linearly (i.e. longitudinally with respect to the direction of flow).

It was therefore an object to produce thermoplastic elastomer mixtures which have isotropic mechanical properties. The intention is that the longitudinal and transverse mechanical properties of these be identical or almost identical, an example being tensile strength or tensile strain at break. Flowability should also be identical with or better than that of comparable prior-art mixtures.

The invention provides a thermoplastic elastomer mixture characterized in that this comprises at least one thermoplastic elastomer TPE, with the exception of a thermoplastic polyurethane TPU, and at least one filler from the group of precipitated silica, or precipitated silicate or carbon black.

The thermoplastic elastomer mixture according to the invention can comprise at least one thermoplastic.

The thermoplastic elastomer mixture according to the invention can comprise at least one fumed silica.

The carbon black used can comprise furnace black, gas black, channel black, lamp black, thermal black, acetylene black, plasma black, or inversion black, known from DE 195 21 565, Si-containing carbon blacks, known from WO 98/45361 or DE 196 13 796, or metal-containing carbon blacks, known from WO 98/42778, arc black, and carbon blacks which are by-products of chemical production processes.

The carbon black can be activated via upstream reactions. The carbon black can be a non-oxidized carbon black. The carbon black can be an oxidized carbon black.

It is possible to use carbon blacks which are used as reinforcing filler in rubber mixtures. It is possible to use pigment blacks. Other carbon blacks can be: conductive carbon black, carbon black used for UV stabilization, carbon black in the form of filler in systems other than rubber, for example in bitumen or plastic, or carbon black in the form of reducing agent in metallurgy.

The DBP value (ASTM D 2414) of the carbon black can be from 30 to 425 ml/100 g, preferably from 35 to 250 ml/100 g, particularly preferably from 40 to 150 ml/100 g, very particularly preferably from 45 to 110 ml/100 g.

The BET surface area (ASTM D 4820) of the carbon black can be from 20 to 1200 $m^2/g$, preferably from 22 to 600 $m^2/g$, particularly preferably from 29 to 300 $m^2/g$, very particularly preferably from 30 to 150 $m^2/g$.

The pH (ASTM D 1512) of the carbon black can be from 2 to 11, preferably from 4 to 10, particularly preferably from 5 to 9.

Examples of carbon black that can be used are PRINTEX® Alpha, PRINTEX® 80, PRINTEX® 85, PRINTEX® 55, PRINTEX® 45, PRINTEX® 40, PRINTEX® P, PRINTEX® 60, PRINTEX® L, PRINTEX® 300, PRINTEX® 30, PRINTEX® 3, PRINTEX® 35, PRINTEX® 25, PRINTEX®, PRINTEX®A, PRINTEX®G, Lamp Black 101, Special Black 550, Special Black 350, Special Black 250, Special Black 100, Pigment Black FW 200, Pigment Black FW 2, Pigment Black FW 1, Pigment Black FW 18, Pigment Black S 170, Pigment Black S 160, PRINTEX® 150 T, PRINTEX® U, PRINTEX®V, Special Black 6, Special Black 5 or Special Black 4 from Evonik Degussa GmbH.

The precipitated silica can be produced via precipitation from alkali metal silicate solution, using acid. The precipitated silicate can be produced via precipitation from alkali metal silicate solution, using metal salt solutions, for example calcium chloride or aluminium sulphate.

The precipitated silicate can preferably be a calcium silicate or aluminium silicate.

The DBP value (DIN 53601) of the precipitated silica or of the precipitated silicate can be from 30 to 400 g/100 g, preferably from 35 to 250 g/100 g, particularly preferably from 50 to 200 g/100 g, very particularly preferably from 80 to 190 g/100 g.

The BET surface area (ISO 5794-1) of the precipitated silica or of the precipitated silicate can be from 15 to 800 $m^2/g$, preferably from 22 to 600 $m^2/g$, particularly preferably from 29 to 300 $m^2/g$, very particularly preferably from 30 to 120 $m^2/g$.

The pH (ISO 787-9) of the precipitated silica or of the precipitated silicate can be from 4 to 12, preferably from 5 to 11.5, particularly preferably from 6 to 11.

The precipitated silica used can by way of example comprise Ultrasil® VN 2, Ultrasil® VN 3, Ultrasil® 3370, Ultrasil® 7000, Ultrasil® 360, SIPERNAT® 325C or SIPERNAT® D17 from Evonik Degussa GmbH.

The precipitated silicate used can by way of example comprise Sipernat® 820 A, Sipernat® 880, Ultrasil® AS 7 or Ultrasil® 880 from Evonik Degussa GmbH.

The precipitated silica or the precipitated silicate can have been hydrophobised by means of a surface modifier and, respectively, by means of a silane.

The following compounds can be used as surface modifier and, respectively, as silane:

a) organosilanes of the formula $(RO)_3Si(C_nH_{2n+1})$ or $(RO)_3Si(C_nH_{2n-1})$, where
   R=alkyl, e.g. methyl-, ethyl-, n-propyl-, isopropyl- or butyl-,
   n=from 1 to 20, b) organosilanes of the formula $R^1_x(RO)_ySi(C_nH_{2n+1})$ or $R^1_x(RO)_ySi(C_nH_{2n-1})$, where
   R=alkyl, e.g. methyl-, ethyl-, n-propyl-, isopropyl- or butyl-,
   $R^1$=alkyl, e.g. methyl-, ethyl-, n-propyl-, isopropyl- or butyl-, cycloalkyl,
   n=from 1 to 20,
   x+y=3,
   x=1 or 2,
   y=1 or 2, c) haloorganosilanes of the formula $X_3Si(C_nH_{2n+1})$ or $X_3Si(C_nH_{2n-1})$, where
   X=Cl or Br,
   n=from 1 to 20, d) haloorganosilanes of the formula $X_2(R^1)Si(C_nH_{2n+1})$ or $X_2(R^1)Si(C_nH_{2n-1})$, where
   X=Cl or Br,
   $R^1$=alkyl, e.g. methyl-, ethyl-, n-propyl-, isopropyl- or butyl-, cycloalkyl,
   n=from 1 to 20, e) haloorganosilanes of the formula $X(R^1)_2Si(C_nH_{2n+1})$ or $X(R^1)_2Si(C_nH_{2n-1})$, where
   X=Cl or Br,
   $R^1$=alkyl, e.g. methyl-, ethyl-, n-propyl-, isopropyl- or butyl-, cycloalkyl,
   n=from 1 to 20, f) organosilanes of the formula $(RO)_3Si(CH_2)_m$—$R^2$, where
   R=alkyl, e.g. methyl-, ethyl-, n-propyl-, isopropyl- or butyl-,
   m=0 or from 1 to 20,
   $R^2$=methyl-, aryl (e.g. —$C_6H_5$, substituted phenyl moieties),
   —$C_4F_9$, $OCF_2$—CHF—$CF_3$, —$C_6F_{13}$, —O—$CF_2$—$CHF_2$,
   —$NH_2$, —$N_3$, —SCN, —CH=$CH_2$, —NH—$CH_2$—$CH_2$—$NH_2$,
   —N($CH_2$—$CH_2$—$NH_2$)$_2$,
   —OOC($CH_3$)C=$CH_2$,
   —$OCH_2$—CH(O)$CH_2$,

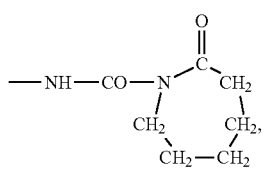

—NH—COO—$CH_3$, —NH—COO—$CH_2$—$CH_3$,
—NH—$(CH_2)_3Si(OR)_3$,
—$S_{x'}$—$(CH_2)_3Si(OR)_3$, where x'=1 to 8
—SH,
—NX'X"X''', where X'=alkyl or aryl, X"=H, alkyl or aryl, X'''=H, alkyl, aryl, benzyl or $C_2H_4NR^3R^4$, where $R^3$=H or alkyl and $R^4$=H or alkyl, g) organosilanes of the formula $(R^5)_{x''}(RO)_{y''}Si(CH_2)_m$—$R^6$, where
   x''=0, 1 or 2,
   y''=1, 2 or 3,
   x''+y''=3,
   $R^5$=alkyl or cycloalkyl,
   m=0 or from 1 to 20,
   $R^6$=methyl-, aryl (e.g. —$C_6H_5$, substituted phenyl moieties),
   —$C_4F_9$, —$OCF_2$—CHF—$CF_3$, —$C_6F_{13}$, —O—$CF_2$—$CHF_2$,
   —$NH_2$, —$N_3$, —SCN, —CH=$CH_2$, —NH—$CH_2$—$CH_2$—$NH_2$,
   —N($CH_2$—$CH_2$—$NH_2$)$_2$,
   —OOC($CH_3$)C=$CH_2$,
   —$OCH_2$—CH(O)$CH_2$,

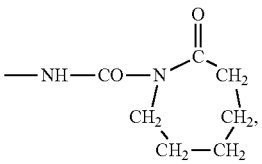

—NH—COO—$CH_3$, —NH—COO—$CH_2$—$CH_3$,
—NH—$(CH_2)_3Si(OR)_3$,
—$S_{x'}$—$(CH_2)_3Si(OR)_3$, where x'=1 to 8
—SH,
—NX'X"R''' (X'=alkyl or aryl, X"=H, alkyl or aryl, X'''=H, alkyl, aryl, benzyl or $C_2H_4NR^3R^4$, where $R^3$=H or alkyl and $R^4$=H or alkyl, h) haloorganosilanes of the formula $X_3Si(CH_2)_m$—$R^7$, where
   X=Cl or Br,
   m=0 or from 1 to 20,
   $R^7$=methyl-, aryl (e.g. —$C_6H_5$, substituted phenyl moieties),
   —$C_4F_9$, —$OCF_2$—CHF—$CF_3$, —$C_6F_{13}$, —O—$CF_2$—$CHF_2$,
   —$NH_2$, —$N_3$, —SCN, —CH=$CH_2$,
   —NH—$CH_2$—$CH_2$—$NH_2$,
   —N($CH_2$—$CH_2$—$NH_2$)$_2$,
   —OOC($CH_3$)C=$CH_2$,
   —$OCH_2$—CH(O)$CH_2$,

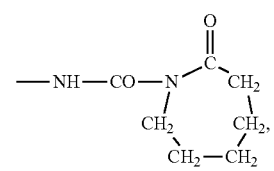

—NH—COO—$CH_3$, —NH—COO—$CH_2$—$CH_3$,
—NH—$(CH_2)_3Si(OR)_3$,

—$S_{x'}$—$(CH_2)_3Si(OR)_3$, where x'=1 to 8,
—SH, i) haloorganosilanes of the formula $(R)X_2Si(CH_2)_m$—$R^8$, where
X=Cl or Br
R=alkyl, e.g. methyl-, ethyl-, n-propyl-, isopropyl- or butyl-,
m=0 or from 1 to 20
$R^8$=methyl-, aryl (e.g. —$C_6H_5$, substituted phenyl moieties),
—$C_4F_9$, —$OCF_2$—CHF—$CF_3$, —$C_6F_{13}$, —O—$CF_2$—$CHF_2$,
—$NH_2$, —$N_3$, —SCN, —CH=$CH_2$, —NH—$CH_2$—$CH_2$—$NH_2$,
—$N(CH_2$—$CH_2$—$NH_2)_2$,
—$OOC(CH_3)C$=$CH_2$,
—$OCH_2$—CH(O)$CH_2$,

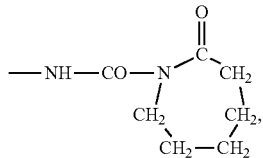

—NH—COO—$CH_3$,   —NH—COO—$CH_2$—$CH_3$,
—NH—$(CH_2)_3Si(OR^9)_3$, where $R^9$ can be =methyl-, ethyl-, propyl-, butyl-,
—$S_{x'}$—$(CH_2)_3Si(OR^9)_3$, where x'=from 1 to 8, $R^9$ can be =methyl-, ethyl-, propyl-, butyl-,
—SH, j) haloorganosilanes of the formula $(R)_2X Si(CH_2)_m$—$R^{10}$, where
X=Cl or Br,
R=alkyl, e.g. methyl-, ethyl-, n-propyl-, isopropyl- or butyl-,
m=0 or from 1 to 20
$R^{10}$=methyl-, aryl (e.g. —$C_6H_5$, substituted phenyl moieties),
—$C_4F_9$, —$OCF_2$—CHF—$CF_3$, —$C_6F_{13}$, —O—$CF_2$—$CHF_2$,
—$NH_2$, —$N_3$, —SCN, —CH=$CH_2$, —NH—$CH_2$—$CH_2$—$NH_2$,
—$N(CH_2$—$CH_2$—$NH_2)_2$,
—$OOC(CH_3)C$=$CH_2$,
—$OCH_2$—CH(O)$CH_2$,

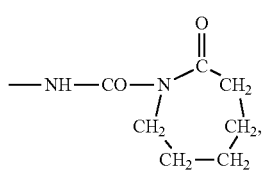

—NH—COO—$CH_3$,   —NH—COO—$CH_2$—$CH_3$,
—NH—$(CH_2)_3Si(OR)_3$,
—$S_{x'}$—$(CH_2)_3Si(OR)_3$, where x'=from 1 to 8,
—SH, k) silazanes of the type

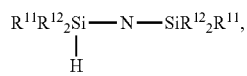

where
$R^{11}$=alkyl, vinyl or aryl,
$R^{12}$=alkyl, vinyl or aryl, l) cyclic polysiloxanes of the type D 3, D 4, D 5, where D 3, D 4 and D 5 mean cyclic polysiloxanes having 3, 4 or 5 units of the type —O—$Si(CH_3)_2$—,
e.g. octamethylcyclotetrasiloxane=D 4

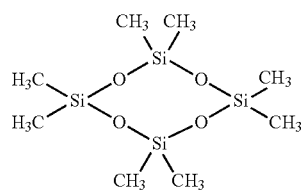

(m) polysiloxanes and, respectively, silicone oils of the formula

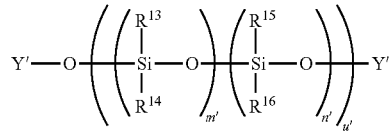

Y'=$CH_3$, H, $C_nH_{2n+1}$, $Si(CH_3)_3$, $Si(CH_3)_2H$, $Si(CH_3)_2OH$, $Si(CH_3)_2$ ($OCH_3$), $Si(CH_3)_2(C_nH_{2n+1})$, where n=from 1 to 20,
$R^{13}$=alkyl, such as $C_nH_{2n+1}$, where n=from 1 to 20, aryl, such as phenyl- and substituted phenyl moieties, $(CH_2)_n$—$NH_2$ or H,
$R^{14}$=alkyl, such as $C_nH_{2n+1}$, where n=from 1 to 20, aryl, such as phenyl- and substituted phenyl moieties, $(CH_2)_n$—$NH_2$ or H,
$R^{15}$=alkyl, such as $C_nH_{2n+1}$, where n=from 1 to 20, aryl, such as phenyl- and substituted phenyl moieties $(CH_2)_n$—$NH_2$ or H,
$R^{16}$=alkyl, such as $C_nH_{2n+1}$, where n=from 1 to 20, aryl, such as phenyl- and substituted phenyl moieties, $(CH_2)_n$—$NH_2$ or H,
where m'=0 or from 1 to 1 000 000,
n'=0 or from 1 to 1 000 000,
u'=0 or from 1 to 1 000 000.

The precipitated silica or the precipitated silicate can be a precipitated silica or a precipitated silicate hydrophobised with dimethyldichlorosilane or with polydimethylsiloxane.

The carbon black, the precipitated silica or the precipitated silicate can take the form of powder, granules or pellets.

In one preferred variant of the thermoplastic elastomer mixture according to the invention, the filler can be a precipitated silicate, preferably precipitated calcium silicate, the thermoplastic can be a polypropylene and the thermoplastic elastomer can be a styrene block copolymer.

The thermoplastic elastomer mixture according to the invention can moreover comprise an oil component and further components, e.g. additives.

A distinction is made between block copolymers and elastomer alloys as a function of the internal structure of thermoplastic elastomers.

Block copolymers have hard and soft segments within a molecule. The block copolymer is therefore composed of one type of molecule, in which the two properties have been distributed (an example being SBS, SIS, SEBS or SEEPS).

Elastomer alloys are polymer blends, i.e. mixtures of finished polymers. The elastomer alloy is therefore composed of a plurality of types of molecule. Tailored materials are obtained by using different mixing ratios and additions, an example being polyolefin elastomer made of polypropylene (PP) and natural rubber (NR). As a function of quantitative proportion, these cover a wide range of hardness.

Among the thermoplastic elastomers, a distinction is made between the following groups:

TPE-O or TPO=thermoplastic elastomers based on olefin, predominantly PP/EPDM, an example being Santoprene (AES/Monsanto). A thermoplastic elastomer which is a physical mixture of an elastomer and a thermoplastic. The elastomer can be an EPDM (ethylene-propylene-diene rubber), EPM (ethylene-propylene rubber), IIR (isoprene-isobutylene rubber), EVA (ethylvinyl acetate), NR (natural rubber), or else a mixture thereof.

TPE-V or TPV=crosslinked thermoplastic elastomers based on an olefin, for example PP/EPDM, an example being Sarlink (DSM). TPV, like TPO, is a thermoplastic elastomer mixture composed of a physical mixture of an elastomer and a thermoplastic. The elastomer can be an EPDM (ethylene-propylene-diene rubber), EPM (ethylene-propylene rubber), IIR (isoprene-isobutylene rubber), EVA (ethylvinyl acetate), NR (natural rubber), or else a mixture thereof. In the case of TPV, the elastomer is also dynamically crosslinked during the mixing process. Typically, a TPV is produced via continuous crosslinking during the mixing of the elastomer phase with the thermoplastic phase. The elastomer here is crosslinked with the aid of a crosslinking agent and/or of a catalyst, during the mixing process. Since the crosslinked elastomer phase of TPV is insoluble and is no longer flowable at relatively high temperatures, TPVs generally have improved oil resistance and solvent resistance, and also lower compression set, in comparison with simple mixtures.

TPE-U or TPU=thermoplastic elastomers based on urethane, e.g. Desmopan (Bayer).

TPE-E or TPC=thermoplastic copolyester, an example being Hytrel (DuPont).

TPE-S or TPS=styrene block copolymers, such as SEPS (styrene-ethylene-propylene-styrene), SEEPS (styrene-ethylene-ethylene-propylene-styrene) and MBS, SEBS (styrene-ethylene-butylene_styrene), SIS (styrene-isoprene-styrene), SBS (styrene_butadiene_styrene), an example being Septon (Kuraray).

TPE-A or TPA=thermoplastic copolyamides, an example being PEBA (polyether block amide), VESTAMID from Evonik).

The thermoplastic elastomer used in the thermoplastic elastomer mixture according to the invention can be a TPE-O, TPE-V, TPE-E, TPE-S or TPE-A.

The thermoplastic elastomer mixture according to the invention can also comprise an oil component, a thermoplastic and a styrene block copolymer.

The oil component can be: paraffinic oils (white oils), naphthenic oils, aromatic mixtures of the oils mentioned (characterized via a proportion of paraffins, naphthenes, aromatics, and viscosity). The viscosity range can be low to high viscosity, for example from 1 to 1300 mm$^2$/s at 40° C.

The thermoplastic can be any material which is not a "rubber" and which is a polymer or polymer blend regarded by the person skilled in the art as of thermoplastic type, for example a polymer that softens when heated and returns to its initial state when it is cooled to room temperature. The thermoplastic can comprise one or more polyolefins, inclusive of polyolefin homopolymers and polyolefin copolymers. Unless otherwise stated, the expression "copolymer" means a polymer derived from two or more monomers (inclusive of terpolymers, tetrapolymers etc.), and the expression "polymer" relates to any carbon-containing compound which has repeat units of one or more different monomers.

Examples of polyolefins can be produced from monoolefin monomers which include inter alia the following: monomers having from 2 to 7 carbon atoms, e.g. ethylene, propylene, 1-butene, isobutylene, 1-pentene, 1-hexene, 1-octene, 3-methyl-1-pentene, 4-methyl-1-pentene, 5-methyl-1-hexene, mixtures of the same and copolymers of the same with (meth)acrylates and/or with vinyl acetates. It is preferable that the thermoplastic is an unvulcanized or uncrosslinked thermoplastic.

In one embodiment, the thermoplastic can comprise polypropylene. The expression "polypropylene" as used herein means broadly any polymer regarded as a "polypropylene" by the person skilled in the art (according to at least one patent or one publication) and includes homopolymers, impact-resistant polymers and random polymers of propylene. The polypropylene used in the compositions described herein can preferably have a melting point higher than 110° C., preferably includes 90% by weight of propylene units and preferably contains isotactic sequences of such units. The polypropylene can also contain atactic sequences or syndiotactic sequences or both. The polypropylene can also contain sequences that are in essence syndiotactic, making the melting point of the polypropylene higher than 110° C. The polypropylene can derive either exclusively from propylene monomers (i.e. those having only propylene units) or can derive mainly from propylene (more than 80% of propylene), while the remainder derives from olefins, in particular ethylene and/or $C_4$-$C_{10}$ α-olefins. The MFI values of the polypropylenes can be from low (10, 15 or 20 g/10 min) to high (from 25 to 30 g/10 min). Other polypropylenes can have a relatively low MFI, examples being "partial" polypropylenes, which have an MFI of less than 1.0. Preference can be given to polypropylenes with a high MFI, because of good processability or good compoundability.

In one or more embodiments, the thermoplastic can be an isotactic polypropylene. The thermoplastic can comprise one or more crystalline propylene homopolymers or propylene copolymers with a melting point above 105° C., measured by DSC. Preferred propylene copolymers encompass, but without any restriction to these, propylene homopolymers or propylene terpolymers, impact-resistant propylene copolymers, random polypropylene and mixtures of the same. Preferred comonomers have 2 carbon atoms or from 4 to 12 carbon atoms. The comonomer is preferably ethylene.

These thermoplastics and processes for producing the same are described in the U.S. Pat. No. 6,342,565.

The expression "random polypropylene", as used herein, generally means a single-phase propylene copolymer with up to 9% by weight, preferably from 2% by weight to 8% by weight, of an α-olefin comonomer. Preferred α-olefin comonomers can have 2 carbon atoms or from 4 to 12 carbon atoms. The α-olefin comonomer can preferably be ethylene.

Thermoplastics used with particular preference can be polyolefins, for example polypropylene, polyurethane, polyethylene, high-density polyethylene or low-density polyethylene, polyamides, for example nylon-6 and nylon-6,6, polyvinyl chloride (PVC), PET, or else a mixture or copolymer made of the abovementioned polymers.

Other thermoplastics can be:

ABS (acrylonitrile-butadiene-styrene), ASA (acrylate-styrene-acrylonitrile), EP (ethylene-propylene), ETFE (ethylene-tetrafluoroethylene), EVA (ethylene-vinyl acetate), EVOH (ethylene-vinyl alcohol), FEP (tetrafluoroethylene-hexafluoropropylene ionomer), MABS (methyl methacrylate-acrylonitrile-butadiene-styrene), MBS (methacrylate-butadiene-styrene), PA (polyamide), PA 6 (nylon-6), PA 11 (Nylon-11), PA 12 (Nylon-12), PA 66 (Nylon-6,6), PA 610 (Nylon-6,10), PA 612 (Nylon-6,12), PB (polybutylene), PBT (polybutylene terephthalate), PC (polycarbonate), PCTFE (polychlorotrifluoroethylene), PE (polyethylene), HDPE (high-density polyethylene), HMW-HDPE (high-density high-molecular-weight polyethylene), UHMW-HDPE (high-density very-high-molecular-weight polyethylene), LDPE (low-density polyethylene), LLDPE (linear low-density polyethylene), VLDPE (very-low-density polyethylene), MDPE (medium-density polyethylene), PEC (chlorinated polyethylene), PET (polyethylene terephthalate), PFA (perfluoroalkoxyalkane), PIB (polyisobutylene), PMMA (polymethyl methacrylate), PMMI (polymethacrylomethylimide), POM (polyoxymethylene), PP (polypropylene), PPB (polypropylene block polymer), PPH (polypropylene homopolymer), PPR (polypropylene random copolymer), PPE (polyphenylene ether), PS (polystyrene), EPS (expanded polystyrene), HIPS (impact-resistant polystyrene), PTFE (polytetrafluoroethylene), PVAC (polyvinyl acetate), PVAL (polyvinyl alcohol), PVC (polyvinyl chloride), PVCC (chlorinated polyvinyl chloride), PVDC (polyvinylidene chloride), PVDF (polyvinylidene fluoride), SAN (styrene-acrylonitrile), SB (styrene-butadiene) or SMAH (styrene-maleic anhydride).

Styrene block copolymers that can be used are:

Block copolymers made of styrene/conjugated diene/styrene, where the conjugated diene can have been completely or to some extent hydrogenated, and also mixtures thereof. These block copolymers can contain from 10 to 50% by weight, preferably from 25 to 35% by weight, of styrene and from 90 to 50% by weight, preferably from 75 to 35% by weight, of conjugated diene. The conjugated diene can be butadiene, isoprene, or a mixture thereof.

The thermoplastic elastomer mixture according to the invention can comprise additives. Additives can be additional fillers or materials added for example for water adsorption, flame retardants, stabilizers, for example hydrolysis stabilizers, antioxidants, colorants and internal lubricants.

Additives in the form of additional fillers are in particular reinforcing fillers, such as the usual organic and inorganic fillers, reinforcing agents, etc. that are known per se. Specific examples that may be mentioned are: inorganic fillers such as silicatic minerals, e.g. powdered quartz, phyllosilicates, such as antigorite, serpentine, hornblends, amphiboles, chrysotile and talc, metal oxides such as kaolin, aluminium oxides, titanium oxides and iron oxides, metal salts such as chalk, heavy spar and inorganic pigments such as cadmium sulphate, zinc sulphide, and also glass and other materials as described by way of example in Pigment+Füllstoff Tabellen [Pigment+Filler Tables], Olaf Lueckert, Verlag O. Lueckert, 1994, pages 506 to 612. Examples of organic fillers that can be used are: carbon, melamine, rosin, cyclopentadienyl resins and graft polymers, and also cellulose fibres, polyamide fibres, polyacrylonitrile fibres, polyurethane fibres, and polyester fibres based on aromatic and/or aliphatic dicarboxylic esters, and in particular carbon fibres.

Added materials used in the form of flame retardants can generally be the flame retardants known from the prior art. Examples of suitable flame retardants are brominated ether (Ixol B 251), brominated alcohols such as dibromoneopentyl alcohol, tribromoneopentyl alcohol and PHT-4-diol, and also chlorinated phosphates, e.g. tris(2-chloroethyl) phosphate, tris(2-chloroisopropyl) phosphate (TCPP), tris(1,3-dichloroisopropyl) phosphate, tris(2,3-dibromopropyl) phosphate and tetrakis(2-chloroethyl) ethylenediphosphates, or a mixture thereof.

Other than the abovementioned halogen-substituted phosphates, it is also possible to use inorganic flame retardants such as red phosphorus and preparations in which red phosphorus is present, expandable graphite, aluminium oxide hydrate, magnesium hydroxide, antimony trioxide, arsenic oxide, ammonium polyphosphate and calcium sulphate or cyanuric acid derivatives such as melamine, or a mixture made of at least two flame retardants, for example of ammonium polyphosphates and melamine, or else, if appropriate, starch, in order to provide flame retardancy to the thermoplastic elastomer mixture produced according to the invention.

Other liquid halogen-free flame retardants that can be used are diethyl ethanephosphonate (DEEP), triethyl phosphate (TEP), dimethyl propylphosphonate (DMPP), diphenyl cresyl phosphate (DPK) and others.

The thermoplastic elastomer mixture according to the invention can comprise from 0.5 to 40% by weight, preferably from 2 to 25% by weight, particularly preferably from 4 to 15% by weight, of fillers selected from the group of precipitated silica, or precipitated silicate or carbon black.

The thermoplastic elastomer mixture according to the invention can comprise from 20 to 80% by weight, preferably from 30 to 70% by weight, of thermoplastic elastomer.

The thermoplastic elastomer mixture according to the invention can comprise from 0 to 85% by weight, preferably from 0.5 to 70% by weight, of additives.

The invention further provides a process for producing the thermoplastic elastomer mixture according to the invention, where the process is characterized in that, in a first step, at least one filler selected from the group of precipitated silica, or precipitated silicate or carbon black, and at least one thermoplastic are mixed to give a masterbatch and, in a second step, the masterbatch is mixed with at least one thermoplastic elastomer, with the exception of a thermoplastic polyurethane TPU.

The thermoplastic can preferably be a polypropylene.

The thermoplastic elastomer can preferably be a TPE-S (styrene block copolymer).

In one preferred variant of the process according to the invention, at least one precipitated silicate, preferably precipitated calcium silicate, and at least one polypropylene can be mixed in a first step to give a masterbatch, and in a second step the masterbatch can be mixed with at least one styrene block copolymer.

The masterbatch can comprise an amount of from 1 to 60% by weight, preferably from 20 to 50% by weight, particularly preferably from 25 to 45% by weight, based on the total weight, of the fillers selected from the group of precipitated silica, precipitated silicate or carbon black.

The masterbatch can also comprise the oil component and additives.

Production of the thermoplastic elastomer mixture according to the invention, and also of the masterbatch, can take place in known apparatuses, for example in an extruder, e.g. a twin-screw extruder, pin-barrel extruder, multiscrew extruder, planetary-gear extruder, or kneader or kneader with discharge screw. A corotating, tightly intermeshing twin-screw extruder can be used with preference.

For production of the masterbatch, at least one filler from the group of precipitated silica, precipitated silicate or carbon black is incorporated by mixing into a thermoplastic, preferably a polypropylene, particularly preferably a polypropylene homopolymer. Addition of the fillers selected from the group of precipitated silica, precipitated silicate or carbon black can take place at various positions on the extruder. Addition of the fillers can preferably take place after the thermoplastic-melting phase. By way of example, the filler can be conveyed into the melt by way of a twin-screw side-feed system.

The masterbatch can be produced in one or more process steps, for example when continuous mixing processes are used. In the case of production in a plurality of process steps, the masterbatch can be produced with filler concentration lower than the final concentration, and the subsequent process steps can be used to increase concentration.

The thermoplastic elastomer mixture can comprise an amount of from 0.5 to 40% by weight, preferably from 2 to 25% by weight, particularly preferably from 4 to 15% by weight, based on total weight, of the fillers selected from the group of precipitated silica, precipitated silicate or carbon black.

The thermoplastic elastomer can be mixed in an extruder with the masterbatch. The thermoplastic elastomer can comprise the oil component, and this means that the thermoplastic elastomer can have been premixed with the oil component. The thermoplastic elastomer or, respectively, the thermoplastic elastomer premixed with the oil component can be introduced into an extruder by way of the main feed. The masterbatch can equally be introduced into the extruder by way of the main feed or preferably by way of the side feed. If the masterbatch is introduced into the extruder together with the thermoplastic elastomer or, respectively, the thermoplastic elastomer premixed with the oil component, by way of the main feed, these components can be premixed.

The filler can be used to improve tensile strain at break, in particular longitudinally.

The invention further provides the use of the thermoplastic elastomer mixture according to the invention in injection-moulded items.

The invention further provides a process for improving the isotropic mechanical properties of injection-moulded items, characterized in that, in a first step, at least one filler selected from the group of precipitated silica, or precipitated silicate or carbon black, and at least one thermoplastic are mixed to give a masterbatch and, in a second step, the masterbatch is mixed with at least one thermoplastic elastomer, with the exception of a thermoplastic polyurethane TPU.

The invention further provides an injection-moulded item comprising the thermoplastic elastomer mixture according to the invention, characterized in that the anisotropy factor has been improved in comparison with an injection-moulded item produced by an identical process and with an identical constitution, where the filler is a fumed silica.

The anisotropy factor is the ratio of tensile strain at break along the direction of flow during the injection-moulding process to the tensile strain at break perpendicularly to the direction of flow during the injection-moulding process. The anisotropy factor is ideally 1.0.

The anisotropy factor of the injection-moulded item according to the invention can be from 0.88 to 1.12, preferably from 0.89 to 1.0.

The compression set, measured according to DIN 53517 (70° C., 22 h, 12 mm test specimen) of the injection-moulded item according to the invention, comprising the thermoplastic elastomer mixture of the invention can be lower than that of the injection-moulded item produced by the same process and with the same constitution, where the filler is a fumed silica.

The flowability of the thermoplastic elastomer mixture according to the invention can be better than that of the thermoplastic elastomer mixture produced by the same process and with the same constitution, where the filler is a fumed silica. Flowability is measured by injection-moulding of a helical test specimen. The length of the moulded helix is used here as a measure of flowability.

The thermoplastic elastomer mixtures according to the invention have improved thermal and mechanical properties.

An advantage of the injection-moulded item according to the invention is that the mechanical properties thereof, for example tensile strain at break, are identical or almost identical longitudinally and transversely, with resultant improvement in anisotropy factor.

The thermoplastic elastomer mixture according to the invention can be used in automobile interiors, for increasing high-temperature lightfastness in automobile-interior applications, as sealing profile for glass-backing applications in automobile construction, and in the building industry, and also in automobile construction and electrical engineering for seals in the region of lamps, preference being given to applications involving dynamic stress.

EXAMPLES

Production of the Compounded Materials

Compounding took place in a corotating, tightly intermeshing ZSK 30 twin-screw extruder from Coperion (previously Werner & Pfleiderer).

Dry Blends:

The dry blends, composed of premix and thermoplastic, are produced in a vertical universal mixer from MTI and introduced into the extruder intake by way of a gravimetric metering system (Gericke). It is preferable that the premix and the thermoplastic are introduced into the intake of the extruder by way of a separate gravimetric metering system.

The premix is composed of 100 parts of SEEPS (styrene-ethylene-ethylene-propylene-styrene). A mixture composed of 100 parts of white oil and of 30 parts of polypropylene homopolyer (PP-h) is added.

Fillers:

The experiments used fillers (FS) selected from the group of precipitated silica, precipitated silicate or carbon black in comparison with fumed silica:

FS1: Precipitated fine-particle calcium silicate with about 6% calcium content in the form of CaO (Sipernat® 880 from Evonik Degussa GmbH).

FS2: Pigment black, produced by the furnace process (Printex® alpha from Evonik Carbon Black GmbH).

FS3: Fumed dichlorodimethyl silane-hydrophobicized silica, based on a hydrophilic starting material with surface area of 130 $m^2/g$ (Aerosil® R 972 V from Evonik Degussa GmbH).

FS4: Fumed dichlorodimethyl silane-hydrophobicized silica, based on a hydrophilic starting material with surface area of 200 m²/g. After the hydrophobicization process, structural modification is also carried out (Aerosil® R 9200 from Evonik Degussa GmbH).

Tables 1-4 list the physicochemical data for the fillers used.

TABLE 1

Sipernat ® 880 (precipitated calcium silicate)

| Properties | Unit | Guideline values |
|---|---|---|
| Specific surface area (BET) | m²/g | 35 |
| Particle size, d50 to ISO 13320-1 | μm | 9 |
| Density after tamping (approx. value) * by method based on DIN EN ISO 787/11, August 1983 | g/l | approx. 300 |
| Loss on drying for 2 h at 105° C. | % by wt. | approx. 6 |
| pH, 5% in water | | 10.5 |
| $SiO_2$ content, based on the substance after ashing | % by wt. | 91 |
| $Al_2O_3$ content | % by wt. | 0.2 |
| $Fe_2O_3$ content | % by wt. | ≤0.03 |
| DBP adsorption to DIN 53601 | g/100 g | 185 |

* ex works

TABLE 2

Printex ® alpha (pigment black produced by the furnace process)

| Properties | Unit | Guideline values |
|---|---|---|
| Type | | furnace |
| Black value $M_y$ | | 240 |
| Relative tinting strength IRB 3 = 100 | % | 100 |
| Volatile content at 950° C. | % | 0.5 |
| OAN, determined using DBP (ISO 4656) | ml/100 g | 100 |
| pH (ISO 787-9) | | 8.7 |
| Ash (ISO 1125) | % | <0.02 |
| BET surface area (ISO 4652) | m²/g | 105 |
| Average primary particle size | nm | 20 |

TABLE 3

Aerosil ® R 972 V (compacted hydrophobic fumed silica)

| Properties | Unit | Guideline values |
|---|---|---|
| Specific surface area (BET) | m²/g | 110 ± 20 |
| C content | % by wt. | 0.6-1.2 |
| Average primary particle size | Nm | 16 |
| Density after tamping (approx. value) * by method based on DIN EN ISO 787/11, August 1983 | g/l | approx. 90 |
| Loss on drying* for 2 h at 105° C. | % by wt. | ≤0.5 |
| Loss on ashing, 2 h at 1000° C., based on the dried substance (2 h at 105° C.) | % by wt. | ≤2.0 |
| pH, 4% strength dispersion | | 3.6-4.4 |
| $SiO_2$ content, based on the substance after ashing | % by wt. | ≥99.8 |

* ex works

TABLE 4

Aerosil ® R 9200 (structure-modified, hydrophobic fumed silica)

| Properties | Unit | Guideline values |
|---|---|---|
| Specific surface area (BET) | m²/g | 170 ± 20 |
| C content | % by wt. | 0.7-1.3 |
| Density after tamping (approx. value) * by method based on DIN EN ISO 787/11, August 1983 | g/l | approx. 200 |
| Loss on drying for 2 h at 105° C. | % by wt. | ≤1.5 |
| pH, 4% strength dispersion | | 3.0-5.0 |
| $SiO_2$ content, based on the substance after ashing | % by wt. | ≥99.8 |
| $Al_2O_3$ content | % by wt. | ≤0.10 |
| $Fe_2O_3$ content | % by wt. | ≤0.01 |
| $TiO_2$ content | % by wt. | ≤0.03 |
| HCl content | % by wt. | ≤0.025 |

* ex works

Filler Addition:

Two different methods can be used for addition of the filler (FS1-4):

1. Direct addition in powder form is possible. For this, the entire filler content is conveyed by way of a separate gravimetric metering system into the melt stream of the extruder by way of an ancillary extruder. This variant is termed powder variant below.

2. The filler is added by means of a masterbatch, where the filler is selected from the group of precipitated silica, precipitated silicate or carbon black are first compounded with the polypropylene homopolymer.

Table 5 shows the parameter settings for the ZSK 30 extruder for masterbatch production.

TABLE 5

| Extruder settings | |
|---|---|
| Rotation rate, rpm | 250 |
| Throughput, kg/h | 5-15 |
| Barrel temp., ° C. | 220-270 |
| Actual values | |
| Melt temp., ° C. | 180-210 |
| Melt pressure, bar | >20 |

This variant is termed masterbatch variant below.

Thermoplastic Elastomer Mixture

The masterbatch is produced together with the dry blend (composed of premix and thermoplastic) in a vertical universal mixer from MTI and introduced by way of a gravimetric metering system (Gericke) into the intake of the extruder. It is preferable that the masterbatch is premixed with, where appropriate, further thermoplastic and introduced by way of a separate gravimetric metering system into the intake of the extruder. The thermoplastic content (polypropylene homopolymer) required in the entire formulation must remain the same and is to some extent replaced by the polypropylene homopolymers present in the masterbatch.

Table 6 shows the parameter settings for the ZSK 30 extruder for elastomer mixture production.

TABLE 6

| Extruder settings | |
|---|---|
| Rotation rate, rpm | 250-300 |
| Throughput, kg/h | 5-15 |
| Barrel temp., °C. | 150-230 |
| Actual values | |
| Melt temp., °C. | 170-200 |
| Melt pressure, bar | >20 |

Injection Moulding:

Plaques of dimensions 110 mm×75 mm×2 mm are produced from all of the elastomer mixtures by conventional injection-moulding processes using a film gate (machine parameters in Table 7).

TABLE 7

| Settings, 2 mm plaque | |
|---|---|
| Cylinder temperature, °C. | 180-220 |
| Peripheral screw speed, mm/sec | 150-170 |
| Back pressure, bar | 40-50 |
| Injection rate, % | 55-65 |
| Hold pressure time, sec. | 5-25 |
| Hold pressure, bar | 280-500 |
| Mould temperature, °C. | 30-35 |
| Cooling time | 15-25 |

The following tests were carried out on the plaques of the elastomer mixtures:
- Shore A hardness test to DIN 53 505,
- determination of ultimate tensile strength, tensile strength, tensile strain at break and stress values in the tensile test, longitudinal/transverse, to D1N 53 504/D2 specimen,
- compression set (CS) to DIN 53717.

The test specimens are punched out from the injection-moulded plaques. The film gate at the edge of the plaque causes flow orientation in the melt. The flow orientation leads to anisotropic properties of the plaque. The specimens are respectively punched out from the plaques longitudinally and transversely with respect to the flow orientation, in order to discern the effect on anisotropy.

Flow Behaviour:

The following tests were carried out on the elastomer mixtures to determine flowability:

Flowability using a spiral test

In this spiral test, plastics melt is charged to an injection mould in the form of a spiral. The shape of the spiral is semicircular (height 5.2 mm, width 7.0 mm) with a length of 100 cm. The length of the injection mouldings is read by associated length-measurement equipment (+/−5 mm) and stated in cm. The mould is conditioned using 10 test specimens, and then the next 10 test specimens are measured (average value). The injection conditions are selected to achieve values as close as possible to 80-90 cm when the reference specimen is used. These settings are used for flow-behaviour measurements on formulations with filler.

Example 1

A TPE-S elastomer mixture is produced as specified above. The respective FS1-4 fill level is 8% by weight, with addition by way of a masterbatch.

In order to assess the flowability of the various TPE-S elastomer mixtures, a flow spiral is produced (12 determinations) under defined conditions (Table 8) from this elastomer mixture by means of an injection-moulding machine.

TABLE 8

| Injection-moulding settings "flow spirals" | |
|---|---|
| Cylinder temperature, °C. | 180-200 |
| Injection time, sec | 8-12 |
| Injection pressure, % | 20-40 |
| Cycle time, sec | 30-40 |
| Mould temperature, °C. | 30-35 |

Surprisingly, this study reveals that the flowability of the TPE-S elastomer mixture does not alter when FS1 is used and alters only slightly when FS2 is used (Table 9). In contrast, flowability is significantly impaired by use of FS3.

The constitution of the reference mixture is the same as that of the mixtures with FS1-4, but without filler.

TABLE 9

| Additive (8%) | Measurement | Reference ref. | FS1 inv. | FS2 inv. | FS3 ref. | FS4 ref. |
|---|---|---|---|---|---|---|
| Spiral length [cm] | 1 | 62 | 62 | 55.5 | 38 | 58 |
| | 2 | 62 | 61.5 | 56 | 38.5 | 57 |
| | 3 | 62 | 62 | 56 | 38 | 57 |
| | 4 | 62 | 61.5 | 55.5 | 38.5 | 57.5 |
| | 5 | 62 | 61.5 | 55.5 | 38.5 | 57.5 |
| | 6 | 61.5 | 61 | 55 | 38 | 56.5 |
| | 7 | 61.5 | 62 | 55.5 | 38 | 57.5 |
| | 8 | 62.5 | 61.5 | 55.5 | 38.5 | 57.5 |
| | 9 | 62 | 62 | 55.5 | 38.5 | 57 |
| | 10 | 62 | 61.5 | 55.5 | 38 | 57 |
| | 11 | 62 | 62 | 55.5 | 38 | 56.5 |
| | 12 | 62 | 61 | 55.5 | 38 | 56 |
| Average spiral length value [cm] | | 62.0 | 61.6 | 55.5 | 38.2 | 57.1 |

Example 2

A TPE-S elastomer mixture is produced as specified above, using the masterbatch variant.

The FS1-4 fill level is 8%. FS1-4 is added by way of a 40% strength masterbatch.

Mechanical properties (longitudinally and transversely) are compared with those of the unfilled TPE-S elastomer mixture.

The test specimens are produced as described in the paragraph concerning injection moulding.

The constitution of the reference mixture is the same as that of the mixtures with FS1-4, but without filler.

TABLE 10

| Longitudinal | Hardness [Shore A] | Longitudinal tensile strength [MPa] | Longitudinal tensile strain at break [%] | Compression set (24 h 70° C.) [%] |
|---|---|---|---|---|
| Reference | 55 | 5.0 | 509 | 40 |
| 8% FS1 (inv.) | 56 | 12.1 | 638 | 44 |
| 8% FS2 (inv.) | 60 | 13.5 | 628 | 41 |
| 8% FS3 (ref.) | 54 | 7.8 | 434 | 40 |
| 8% FS4 (ref.) | 56 | 10.5 | 668 | 44 |

TABLE 11

| Transverse | Hardness [Shore A] | Transverse tensile strength [MPa] | Transverse tensile strain at break [%] | Compression set (24 h 70° C.) [%] |
|---|---|---|---|---|
| Reference | 55 | 15.4 | 806 | 40 |
| 8% FS1 (inv.) | 56 | 16.1 | 703 | 44 |
| 8% FS2 (inv.) | 60 | 19.3 | 700 | 41 |
| 8% FS3 (ref.) | 56 | 15.2 | 625 | 40 |
| 8% FS4 (ref.) | 56 | 18.6 | 820 | 44 |

Surprisingly, it is found that, in comparison with fumed silica FS3 and FS4, the use of fillers FS1 and FS2 raised longitudinal tensile strength, while compression set can advantageously be maintained at the same level.

TABLE 12

| | Longitudinal tensile strain at break [%] | Transverse tensile strain at break [%] | Anisotropy factor |
|---|---|---|---|
| Reference | 509 | 806 | 0.63 |
| 8% FS1 (inv.) | 638 | 703 | 0.91 |
| 8% FS2 (inv.) | 628 | 700 | 0.90 |
| 8% FS3 (ref.) | 434 | 625 | 0.69 |
| 8% FS4 (ref.) | 668 | 820 | 0.81 |

The two tables 10 and 11 that show tensile strain at break reveal a very important novel advantage of the thermoplastic elastomers of the invention with the fillers FS1 and FS2 used, in comparison with fumed silica FS3 and FS4 in TPE-S.

By virtue of the change in tensile strain at break (longitudinal) to the level of tensile strain at break (transverse), the longitudinal and transverse tensile strain at break properties become much more similar, and this increases the dimensional stability of the subsequent component. Table 12 uses the anisotropy factor (factor obtained by dividing tensile strain at break (longitudinal) by tensile strain at break (transverse)) to describe this property improvement. The ideal situation is an anisotropy factor of 1.

Example 3

A TPE-S elastomer mixture is produced as specified above using the masterbatch variant, and also using the powder variant.

The addition-method differences are demonstrated using an 8% fill level for the filler FS1. FS1 is added by way of a 40% strength masterbatch in the masterbatch variant. In the powder variant, all of the FS1 filler content is added by way of a separate gravimetric metering system into the melt stream in the extruder by means of an ancillary extruder.

Mechanical properties (longitudinal and transverse) are compared with the unfilled TPE-S elastomer mixture (Tables 13 and 14).

The constitution of the reference mixture is the same as that of the mixture with FS1, but without filler.

TABLE 13

| | Hardness [Shore A] | Longitudinal tensile strength [MPa] | Longitudinal tensile strain at break [%] | Compression set (24 h 70° C.) [%] |
|---|---|---|---|---|
| Reference | 55 | 5.0 | 509 | 40 |
| Powder variant | 61 | 5.9 | 512 | 43 |
| Masterbatch variant | 56 | 12.1 | 638 | 44 |

TABLE 14

| | Hardness [Shore A] | Tranvserse tensile strength [MPa] | Transverse tensile strain at break [%] | Compression set (24 h 70° C.) [%] |
|---|---|---|---|---|
| Reference | 55 | 15.4 | 806 | 40 |
| Powder variant | 61 | 11.5 | 726 | 43 |
| Masterbatch variant | 56 | 16.1 | 703 | 44 |

Surprisingly, use of the filler FS1 is found to achieve a significant improvement in the TPE-S elastomer mixture in relation to longitudinal tensile strain at break and tensile strength, when the filler is added by way of the masterbatch variant of the invention.

The invention claimed is:

1. A thermoplastic elastomer mixture, comprising at least one thermoplastic elastomer (TPE), with the exception of a thermoplastic polyurethane (TPU), at least one filler in an amount of 0.5 to 40% by weight selected from precipitated silica or precipitated silicate, a thermoplastic, comprising one or more polyolefines, and an oil component, wherein the components of the mixture are present in relative amounts suitable for forming an injection moulded product where the mechanical properties are the same or similar when measured transversely or longitudinally.

2. The thermoplastic elastomer mixture according to claim 1, wherein the thermoplastic is polypropylene.

3. A thermoplastic elastomer mixture, comprising at least one thermoplastic elastomer (TPE), with the exception of a thermoplastic polyurethane (TPU), an oil component, thermoplastic and at least one filler from precipitated silica, precipitated silicate or carbon black, wherein the filler is a precipitated silicate, the thermoplastic is a polypropylene and the thermoplastic elastomer is a styrene block copolymer.

4. A process for producing the thermoplastic elastomer mixture according to claim 1, comprising mixing at least one filler selected from precipitated silica or precipitated silicate, and at least one thermoplastic to give a masterbatch and, mixing the masterbatch with at least one thermoplastic elastomer, with the exception of a thermoplastic polyurethane (TPU).

5. The process for producing the thermoplastic elastomer mixture according to claim 4, wherein the thermoplastic is a polypropylene.

6. In a process for producing injection-moulded items, wherein the improvement comprises injecting the thermoplastic elastomer mixture according to claim 1 into a mould to produce the injection-moulded items.

7. A process for improving the isotropic mechanical properties of injection-moulded items, comprising, in a first step, mixing at least one filler selected from precipitated silicas or precipitated silicates, an oil component and at least one thermoplastic to give a masterbatch having 1 to 60% by weight filler and, in a second step, mixing the masterbatch with at least one thermoplastic elastomer, with the exception of a thermoplastic polyurethane (TPU) to form a composition where the filler is present in an amount of 0.5 to 40% by weight and which imparts to an injection moulded product formed therefrom mechanical properties, which are the same or similar when measured either transversely or longitudinally.

8. An injection-moulded item comprising the thermoplastic elastomer mixture according to claim 1, characterized in that the anisotropy factor has been improved in comparison with an injection-moulded item produced by an identical process and with an identical constitution, where the filler is a fumed silica.

9. The injection-moulded item according to claim 8, characterized in that the anisotropy factor is from 0.88 to 1.12.

\* \* \* \* \*